US008904026B2

(12) United States Patent
Weigand et al.

(10) Patent No.: US 8,904,026 B2
(45) **Date of Patent: *Dec. 2, 2014**

(54) TIME-SHIFTING STREAMING DATA

(75) Inventors: Gilbert G. Weigand, Ashburn, VA (US); William J. Raduchel, Sterling, VA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/620,816

(22) Filed: Sep. 15, 2012

(65) Prior Publication Data

US 2013/0173820 A1 Jul. 4, 2013

Related U.S. Application Data

(63) Continuation of application No. 13/549,205, filed on Jul. 13, 2012, now abandoned, which is a continuation of application No. 13/173,290, filed on Jun. 30, 2011, now Pat. No. 8,224,991, which is a continuation of application No. 12/732,929, filed on Mar. 26, 2010, now Pat. No. 7,991,911, which is a continuation of application No. 11/754,661, filed on May 29, 2007, now Pat. No. 7,694,013, which is a continuation of application No. 10/090,727, filed on Mar. 6, 2002, now Pat. No. 7,237,033, which is a continuation-in-part of application No. 09/893,692, filed on Jun. 29, 2001, now Pat. No. 7,266,609.

(60) Provisional application No. 60/343,183, filed on Dec. 31, 2001, provisional application No. 60/286,964, filed on Apr. 30, 2001.

(51) Int. Cl.

| | |
|---|---|
| ***G06F 15/16*** | (2006.01) |
| ***H04L 29/06*** | (2006.01) |
| ***H04L 12/18*** | (2006.01) |
| ***H04L 29/12*** | (2006.01) |
| ***H04N 21/222*** | (2011.01) |
| ***H04N 21/231*** | (2011.01) |
| ***H04N 21/61*** | (2011.01) |
| ***H04N 21/64*** | (2011.01) |
| *H04L 29/08* | (2006.01) |

(52) U.S. Cl.

CPC .... *H04L 29/06244* (2013.01); *H04L 29/06176* (2013.01); *H04L 29/06238* (2013.01); *H04L 12/1877* (2013.01); *H04L 29/06* (2013.01); *H04L 29/06027* (2013.01); *H04L 29/12009* (2013.01); *H04L 61/00* (2013.01); *H04N 21/222* (2013.01); *H04N 21/23106* (2013.01); *H04N 21/6125* (2013.01); *H04N 21/64* (2013.01); *H04L 65/607* (2013.01); *H04L 65/605* (2013.01); *H04L 12/1854* (2013.01); *H04L 67/2823* (2013.01); *H04L 69/329* (2013.01)

USPC ............ 709/231; 709/232; 709/238; 709/245

(58) Field of Classification Search

CPC ............ H04N 21/2387; H04N 21/239; H04N 21/2393; H04N 21/27; H04N 21/274; H04N 21/432; H04N 21/4325; H04N 21/433; H04N 21/47217; H04L 29/06176; H04L 29/06238; H04L 29/06244

USPC ........... 725/86, 91, 87, 31; 345/845; 370/477, 370/395.52; 709/231, 205; 380/241

See application file for complete search history.

(56) References Cited

U.S. PATENT DOCUMENTS 4,809,262 A 2/1989 Klose et al.
4,872,160 A 10/1989 Hemmady et al.

(Continued)

FOREIGN PATENT DOCUMENTS

CA 2445869 11/2002
CN 1511289 7/2004

(Continued)

OTHER PUBLICATIONS

U.S. Appl. No. 13/227,402, Oct. 28, 2013, Office Action.

(Continued)

*Primary Examiner* — Le H Luu

(74) *Attorney, Agent, or Firm* — Keller Jolley Preece

(57) ABSTRACT

Streaming to a terminal by using a duplicating switch to receive a stream of data units, using the duplicating switch to store content from the stream, using the duplicating switch to generate a second stream that incorporates the content that was stored and address information corresponding to more than one terminal whose addressing information was not part of the first stream, and using the duplicating switch to make the second stream of data units available to two or more terminals.

28 Claims, 10 Drawing Sheets

100

(56) References Cited

U.S. PATENT DOCUMENTS 5,014,125 A 5/1991 Pocock et al.
5,283,639 A 2/1994 Esch et al.
5,493,568 A 2/1996 Sampat et al.
5,543,856 A 8/1996 Rosser et al.
5,583,561 A 12/1996 Baker et al.
5,600,364 A 2/1997 Hendricks et al.
5,600,646 A 2/1997 Polomski
5,604,542 A 2/1997 Dedrick
5,608,446 A 3/1997 Carr et al.
5,646,675 A 7/1997 Copriviza et al.
5,682,597 A 10/1997 Ganek et al.
5,689,641 A 11/1997 Ludwig et al.
5,742,597 A 4/1998 Holt et al.
5,774,660 A 6/1998 Brendel et al.
5,778,187 A 7/1998 Monteiro et al.
5,799,002 A 8/1998 Krishnan
5,802,301 A 9/1998 Dan et al.
5,809,237 A 9/1998 Watts et al.
5,815,662 A 9/1998 Ong
5,819,036 A 10/1998 Adams et al.
5,838,790 A 11/1998 McAuliffe et al.
5,838,912 A 11/1998 Poon et al.
5,841,763 A 11/1998 Leondires et al.
5,867,502 A 2/1999 Chang
5,872,588 A 2/1999 Aras et al.
5,889,950 A 3/1999 Kuzma
5,907,324 A 5/1999 Larson et al.
5,913,062 A 6/1999 Vrvilo et al.
5,917,830 A 6/1999 Chen et al.
5,920,700 A 7/1999 Gordon et al.
5,935,245 A 8/1999 Sherer
5,946,614 A 8/1999 Robbins et al.
5,961,603 A 10/1999 Kunkel et al.
5,969,770 A 10/1999 Horton
5,973,722 A 10/1999 Wakai et al.
5,983,005 A 11/1999 Monteiro et al.
5,995,943 A 11/1999 Bull et al.
6,006,265 A 12/1999 Rangan et al.
6,011,782 A 1/2000 DeSimone et al.
6,018,766 A 1/2000 Samuel et al.
6,034,746 A 3/2000 Desai et al.
6,052,805 A 4/2000 Chen et al.
6,061,349 A 5/2000 Coile et al.
6,061,504 A 5/2000 Tzelnic et al.
6,064,376 A 5/2000 Berezowski et al.
6,097,720 A 8/2000 Araujo et al.
6,101,187 A 8/2000 Cukier et al.
6,115,752 A 9/2000 Chauhan
6,119,163 A 9/2000 Monteiro et al.
6,141,336 A 10/2000 Bauchot et al.
6,151,621 A 11/2000 Colyer et al.
6,151,632 A 11/2000 Chaddha et al.
6,157,635 A 12/2000 Wang et al.
6,173,314 B1 1/2001 Kurashima et al.
6,189,039 B1 2/2001 Harvey et al.
6,195,680 B1 2/2001 Goldszmidt et al.
6,201,859 B1 3/2001 Memhard et al.
6,208,975 B1 3/2001 Bull et al.
6,216,129 B1 4/2001 Eldering
6,226,686 B1 5/2001 Rothschild et al.
6,253,238 B1 6/2001 Lauder et al.
6,259,701 B1 7/2001 Shur et al.
6,266,335 B1 7/2001 Bhaskaran
6,298,088 B1 10/2001 Bhatt et al.
6,298,089 B1 10/2001 Gazit
6,298,129 B1 10/2001 Culver et al.
6,308,327 B1 10/2001 Liu et al.
6,314,451 B1 11/2001 Landsman et al.
6,314,464 B1 11/2001 Murata et al.
6,327,622 B1 12/2001 Jindal et al.
6,339,761 B1 1/2002 Cottingham
6,347,090 B1 2/2002 Ooms et al.
6,357,042 B2 3/2002 Srinivasan et al.
6,360,195 B1 3/2002 Liao et al.
6,363,075 B1 3/2002 Huang et al.
6,363,429 B1 3/2002 Ketcham
6,370,112 B1 4/2002 Voelker
6,377,996 B1 4/2002 Lumelsky et al.
6,381,746 B1 4/2002 Urry
6,389,462 B1 5/2002 Cohen et al.
6,404,745 B1 6/2002 O'Neil et al.
6,411,773 B1 6/2002 De Vos et al.
6,415,312 B1 7/2002 Boivie
6,415,323 B1 7/2002 McCanne et al.
6,418,214 B1 7/2002 Smythe et al.
6,434,622 B1 8/2002 Monteiro et al.
6,437,830 B1 8/2002 Horlander
6,449,657 B2 9/2002 Stanbach et al.
6,457,043 B1 9/2002 Kwak et al.
6,466,550 B1 10/2002 Foster et al.
6,490,285 B2 12/2002 Lee et al.
6,490,320 B1 12/2002 Vetro et al.
6,493,872 B1 12/2002 Rangan et al.
6,505,169 B1 1/2003 Bhagavath et al.
6,510,553 B1 1/2003 Hazra
6,516,350 B1 2/2003 Lumelsky et al.
6,526,426 B1 2/2003 Lakritz
6,564,003 B2 5/2003 Marko et al.
6,564,380 B1 5/2003 Murphy
6,587,138 B1 7/2003 Vogt et al.
6,606,581 B1 8/2003 Nickerson et al.
6,615,039 B1 9/2003 Eldering
6,622,174 B1 9/2003 Ukita et al.
6,625,773 B1 9/2003 Boivie et al.
6,646,997 B1 11/2003 Baxley et al.
6,665,726 B1 12/2003 Leighton et al.
6,684,249 B1 1/2004 Frerichs et al.
6,698,020 B1 2/2004 Zigmond et al.
6,701,355 B1 3/2004 Brandt et al.
6,704,930 B1 3/2004 Eldering et al.
6,708,213 B1 3/2004 Bommaiah et al.
6,711,212 B1 3/2004 Lin
6,718,551 B1 4/2004 Swix et al.
6,728,356 B1 4/2004 Carroll
6,728,784 B1 4/2004 Mattaway
6,738,978 B1 5/2004 Hendricks et al.
6,751,219 B1 6/2004 Lipp et al.
6,785,704 B1 8/2004 McCanne
6,826,185 B1 11/2004 Montanaro et al.
6,839,734 B1 1/2005 Vega-Garcia et al.
6,847,618 B2 1/2005 Laursen et al.
6,850,707 B1 2/2005 Chang et al.
6,856,967 B1 2/2005 Woolston et al.
6,873,627 B1 3/2005 Miller et al.
6,879,565 B2 4/2005 Baxley et al.
6,889,385 B1 5/2005 Rakib et al.
6,891,828 B2 5/2005 Ngai
6,910,078 B1 6/2005 Raman et al.
6,978,470 B2 12/2005 Swix et al.
6,993,081 B1 1/2006 Brunheroto et al.
6,996,102 B2 2/2006 Pegrum et al.
7,007,235 B1 2/2006 Hussein et al.
7,016,351 B1 3/2006 Farinacci et al.
7,039,932 B2 5/2006 Eldering
7,054,949 B2 5/2006 Jennings
7,062,510 B1 6/2006 Eldering
7,072,972 B2 7/2006 Chin et al.
7,089,577 B1 8/2006 Rakib et al.
7,100,183 B2 8/2006 Kunkel et al.
7,124,166 B2 10/2006 Brown
7,133,922 B1 11/2006 She et al.
7,142,509 B1 11/2006 Rovner et al.
7,187,690 B2 3/2007 Taylor
7,203,758 B2 4/2007 Cook et al.
7,237,033 B2 6/2007 Weigand et al.
7,266,609 B2 9/2007 Bill et al.
7,292,571 B2 11/2007 Brown
7,299,291 B1 11/2007 Shaw
7,394,850 B1 7/2008 Gordon
7,430,609 B2 9/2008 Brown et al.
7,447,738 B1 11/2008 Andrews et al.
7,500,258 B1 3/2009 Eldering
7,548,962 B2 6/2009 Weber et al.
7,694,013 B2 4/2010 Weigand

(56) References Cited

U.S. PATENT DOCUMENTS 7,711,791 B2 5/2010 DuVall et al.
7,895,076 B2 2/2011 Kutaragi et al.
7,921,157 B2 4/2011 Brown
7,991,911 B2 8/2011 Weigand
8,028,092 B2 9/2011 Brown et al.
8,094,647 B2 1/2012 Elliott et al.
8,130,755 B2 3/2012 Brown
8,135,620 B2 3/2012 Barsade et al.
8,224,991 B2 7/2012 Weigand
8,463,853 B2 6/2013 Brown
2001/0018771 A1* 8/2001 Walker et al. .................. 725/91
2001/0030667 A1* 10/2001 Kelts ............................ 345/854
2001/0036198 A1* 11/2001 Arsenault et al. ............ 370/477
2001/0044851 A1 11/2001 Rothman et al.
2001/0047516 A1* 11/2001 Swain et al. .................... 725/86
2001/0048662 A1 12/2001 Suzuki et al.
2001/0049620 A1 12/2001 Blasko
2002/0013852 A1* 1/2002 Janik ............................ 709/231
2002/0015496 A1* 2/2002 Weaver et al. ................ 380/241
2002/0019845 A1* 2/2002 Hariton ......................... 709/205
2002/0019984 A1 2/2002 Rakib
2002/0023267 A1* 2/2002 Hoang ........................... 725/87
2002/0024956 A1* 2/2002 Keller-Tuberg .......... 370/395.52
2002/0026482 A1 2/2002 Morishige et al.
2002/0026636 A1* 2/2002 LeComte ....................... 725/31
2002/0031126 A1 3/2002 Crichton et al.
2002/0040404 A1 4/2002 Lahr
2002/0059591 A1 5/2002 Nakagawa
2002/0065922 A1 5/2002 Shastri
2002/0082914 A1 6/2002 Beyda et al.
2002/0093963 A1 7/2002 Roullet et al.
2002/0103863 A1 8/2002 Pearson
2002/0103864 A1 8/2002 Rodman et al.
2002/0112004 A1 8/2002 Reid et al.
2002/0112069 A1 8/2002 Sim
2002/0114302 A1 8/2002 McDonald et al.
2002/0116532 A1 8/2002 Berg
2002/0124099 A1* 9/2002 Srinivasan et al. ............ 709/231
2002/0126685 A1 9/2002 Leatherbury et al.
2002/0131400 A1 9/2002 Tinsely et al.
2002/0161847 A1 10/2002 Weigand et al.
2002/0161910 A1 10/2002 Bill et al.
2002/0172508 A1 11/2002 Zennou
2002/0191543 A1 12/2002 Buskirk et al.
2002/0191950 A1 12/2002 Wang
2003/0005052 A1 1/2003 Feuer et al.
2003/0018966 A1 1/2003 Cook et al.
2003/0018968 A1 1/2003 Avnet
2003/0061278 A1 3/2003 Agarwalla et al.
2003/0067934 A1 4/2003 Hooper et al.
2003/0099202 A1 5/2003 Lear et al.
2003/0126197 A1 7/2003 Black et al.
2003/0145038 A1 7/2003 Bin Tariq et al.
2003/0188308 A1 10/2003 Kizuka
2004/0025186 A1 2/2004 Jennings et al.
2004/0205829 A1 10/2004 Hane, III
2005/0010653 A1 1/2005 McCanne
2005/0015796 A1 1/2005 Bruckner et al.
2005/0036030 A1 2/2005 Forkner et al.
2006/0188084 A1 8/2006 Rogers et al.
2006/0248231 A1 11/2006 O'Rourke et al.
2008/0049723 A1 2/2008 Bill
2009/0150937 A1 6/2009 Ellis et al.
2011/0173054 A1 7/2011 Kutaragi et al.
2011/0208582 A1 8/2011 Hoyle
2011/0225046 A1 9/2011 Eldering et al.
2011/0231255 A1 9/2011 Urbanski et al.
2012/0066058 A1 3/2012 Brown
2013/0010794 A1 1/2013 Bill
2013/0016721 A1 1/2013 Bill
2013/0063545 A1 3/2013 Brown
2013/0063546 A1 3/2013 Brown
2013/0066904 A1 3/2013 Brown
2013/0173820 A1* 7/2013 Weigand et al. .............. 709/231
2013/0173821 A1 7/2013 Weigand et al.

FOREIGN PATENT DOCUMENTS

EP 1063814 12/2000
EP 1071287 1/2001
EP 1220542 7/2002
EP 2395700 12/2011
GB 2309849 8/1997
JP 08-320800 12/1996
JP 9270793 10/1997
JP 11-232201 8/1999
JP 11-261580 9/1999
JP 2000-010895 1/2000
JP 2000-029813 1/2000
JP 2000-172618 6/2000
JP 2000-244427 9/2000
JP 2001-508258 5/2001
JP 2002-280982 9/2002
JP 2002-281483 9/2002
JP 2002-330416 11/2002
JP 2002-354449 12/2002
JP 2003-111052 4/2003
JP 2003-284041 10/2003
JP 2004-536494 12/2004
WO 96/38961 12/1996
WO 98/31107 7/1998
WO 99/27741 6/1999
WO 00/28713 5/2000
WO 00/65775 11/2000
WO 00/65776 11/2000
WO 00/69101 11/2000
WO 00/69163 11/2000
WO 00/74373 12/2000
WO 02/88982 11/2002

OTHER PUBLICATIONS

U.S. Appl. No. 13/620,547, Aug. 7, 2013, Office Action.
U.S. Appl. No. 13/620,820, Sep. 12, 2013, Office Action.
U.S. Appl. No. 13/620,906, Aug. 15, 2013, Office Action.
Keller et al., An Active Router Architecture for Multicast Video Distribution, St. Louis, Missouri.
Lockwood et al., Reprogrammable Network Packet Processing on the Field Programmable Port Extender (FPX), 2001, St. Louis Missouri.
Taylor et al., Dynamic Hardware Plugins (DHP): Exploitating Reconfigurable Hardware for High Performance Programmable Routers, 2002, St. Louis, Missouri.
Choi et al., Design of a Flexible Open Platform for High Performance Active Networks, 1999, St. Louis, Missouri.
PCT International Search Report, issued in PCT/US02/41769, Apr. 8, 2003, 6 pages.
International Search Report dated Jul. 2, 2003, (App No. PCT/US03/12086).
International Preliminary Examination Report (IPER), dated Feb. 24, 2004, App No. PCT/US02/13362.
F. Gong: Multipoint audio and video control for packet-based multimedia conferencing (1994), International Multimedia Conference, pp. 425-432, ISBN: 0-89791-686-7.
Chinese Office Action mailed Aug. 12, 2005 in Application No. 02810729.2.
Chinese Office Action mailed Nov. 2, 2007 in Application No. 02810729.2.
Chinese Office Action mailed May 30, 2008 in Application No. 02810729.2.
International Search Report dated Jul. 12, 2002, issued in PCT/US02/13363.
International Search Report dated Oct. 29, 2002, issued in PCT/US02/13362.
Office Action for Japanese Application 2002-586120 dated Apr. 10, 2008, 1 page.
Miyazaki, S., et al., "Stream Transmission Control Application Program Interface," Technical Report of IEICE, vol. 100, No. 672, pp. 341-346, in Japanese with English-language Abstract and and English-language excerpt, 11 pages total.
Furht, B. et al., "IP Simulcast: A New Technique for Multimedia Broadcasting Over the Internet;" Cit. Journal of Computing and

(56) References Cited

OTHER PUBLICATIONS

Information Technology, Zagreb, HR, vol. 6, No. 3, Sep. 1, 1998, pp. 245-254, XP000870379, ISSN: 1330-1136.
ST2 Working Group L. Degrossi & L. Berger et al., "Internet Stream Protocol Version 2 (ST2) Protocol Specification-Version ST2+; rfc1819.txt" IETF Standard Internet Engineering Task Force, IETF, CH, Aug. 1, 1995, XP015007606 ISSN: 0000-0003, Chapter 1, p. 6-p. 19.
Examination Report for European Application No. 02734066.0, mailed Apr. 16, 2009.
Australian Office Action issued in 200205256 of Feb. 9, 2007.
Australian Office Action issued in 200205256 of May 26, 2008.
Canadian Intellectual Property Office, Office Action of Jan. 19, 2011, App No. 2,445,869 (3 pages).
Chinese Office Action issued in 02810728.4 on Feb. 29, 2008.
Chinese Office Action issued in 02810728.4 on Jul. 13, 2007.
Chinese Office Action issued in 02810728.4 on Jun. 23, 2006.
European Office Action issued EP 02725839.1 on Apr. 16, 2009, 5 pages.
Indian Office Action issued in 1764/DELNP/2003 on Apr. 16, 2008.
Office Action for Japanese Application 2002-586120 dated Oct. 10, 2008, 1 page.
Office Action for Japanese Application 2002-586120 dated Mar. 4, 2008, 1 page.
Supplemental European Search Report Issued in EP 02734066.0 on Jul. 31, 2006.
Oh-ishi, Tetsuya, et al. "Contents Delivery Function over Managed Network," IEICE Technical Report, vol. 101, No. 120, Jun. 14, 2001.
Supplementary European Search Report issued in EP 02725839 on Nov. 18, 2008.
Chickering, David Maxwell et al. "Targeted advertising with inventory management." Proceedings of the 2nd ACM conference on Electronic Commerce. Minneapolis, 2000. pp. 145-149. ACM Press.
Langheinrich, Marc et al. "Unintrusive Customization techniques for Web Advertising". Proceeding of the eighth international conference on World Wide Web. Computer Networks. Amsterdam, Netherlands, 1999. pp. 1259-1272.
Mobasher, Bamshad et al. "Effective Personalization based on Association Rule Discovery from Web Usage Data." Proceedings of the 3rd International workshop on Web Information and Data Management. Atlanta, 2001. pp. 9-15. ACM Press.
Nakano, Tadashi et al. "User Adaptive Content Delivery Mechanism on the World Wide Web." Proceedings of the 2002 ACM symposium on Applied Computing. Madrid, Spain. 2002. pp. 1140-1146. ACM Press.
Datta, Anindya et al. "An Architecture to support scalable online personalization on the web." The VLDB Journal. vol. 10, Issue 1. Aug. 2001. Springer-Verlag New York. pp. 104-117.
Brassil, Jack et al "Enhancing Internet Streaming Media with Cueing Protocols." Twentieth Annual Joint Conference of the IEEE Computer and Communications Societies. IEEE Press. 2001. vol. 1. 95-103.
McGrath, E. "Digital Insertion of Advertising into a Digital Stream." Broadcasting Convention. 1997. 258-61.
International Search Report, PCT/US03/19774, dated Dec. 18, 2003.
International Search Report, PCT/US03/12873, dated Jul. 14, 2003.
Supplemental European Search Report, EP02725839, dated Nov. 24, 2008.
U.S. Appl. No. 09/893,692, Dec. 23, 2004, Office Action.
U.S. Appl. No. 09/893,692, Sep. 14, 2005, Notice of Allowance.
U.S. Appl. No. 09/893,692, Mar. 28, 2007, Notice of Allowance.
U.S. Appl. No. 10/090,727, May 10, 2005, Office Action.
U.S. Appl. No. 10/090,727, Jan. 3, 2007, Notice of Allowance.
U.S. Appl. No. 10/134,439, Jul. 25, 2005, Office Action.
U.S. Appl. No. 10/134,439, Jun. 12, 2006, Notice of Allowance.
U.S. Appl. No. 10/134,552, Oct. 11, 2005, Office Action.
U.S. Appl. No. 10/134,552, May 24, 2006, Office Action.
U.S. Appl. No. 10/134,552, Aug. 8, 2006, Office Action.
U.S. Appl. No. 10/134,552, Mar. 5, 2007, Office Action.
U.S. Appl. No. 10/134,552, Sep. 11, 2007, Office Action.
U.S. Appl. No. 10/134,552, Apr. 4, 2008, Notice of Allowance.
U.S. Appl. No. 10/157,909, Aug. 9, 2006, Office Action.
U.S. Appl. No. 10/157,909, Jan. 30, 2007, Notice of Allowance.
U.S. Appl. No. 10/157,909, May 25, 2007, Notice of Allowability.
U.S. Appl. No. 10/157,909, Jun. 8, 2007, Notice of Allowability.
U.S. Appl. No. 10/157,909, Sep. 10, 2007, Notice of Allowability.
U.S. Appl. No. 10/183,420, Dec. 13, 2005, Office Action.
U.S. Appl. No. 10/183,420, Jun. 22, 2006, Office Action.
U.S. Appl. No. 10/183,420, Dec. 12, 2006, Office Action.
U.S. Appl. No. 10/183,420, Jun. 28, 2007, Office Action.
U.S. Appl. No. 10/183,420, May 20, 2010, Office Action.
U.S. Appl. No. 10/183,420, Nov. 3, 2010, Office Action.
U.S. Appl. No. 10/183,420, Feb. 15, 2011, Office Action.
U.S. Appl. No. 10/183,420, Jun. 7, 2011, Notice of Allowance.
U.S. Appl. No. 11/549,934, Sep. 4, 2009, Office Action.
U.S. Appl. No. 11/549,934, Apr. 28, 2010, Office Action.
U.S. Appl. No. 11/549,934, Nov. 29, 2010, Notice of Allowance.
U.S. Appl. No. 11/754,661, Jun. 19, 2009, Office Action.
U.S. Appl. No. 11/754,661, Nov. 18, 2009, Notice of Allowance.
U.S. Appl. No. 11/761,050, Jul. 27, 2009, Office Action.
U.S. Appl. No. 11/761,050, Feb. 3, 2010, Office Action.
U.S. Appl. No. 11/761,050, Jul. 6, 2011, Notice of Allowance.
U.S. Appl. No. 11/761,050, Oct. 21, 2011, Notice of Allowance.
U.S. Appl. No. 11/848,430, Aug. 8, 2011, Office Action.
U.S. Appl. No. 11/848,430, Jun. 21, 2012, Notice of Allowance.
U.S. Appl. No. 11/848,430, May 9, 2013, Notice of Allowance.
U.S. Appl. No. 12/732,929, Oct. 7, 2010, Office Action.
U.S. Appl. No. 12/732,929, Mar. 18, 2011, Notice of Allowance.
U.S. Appl. No. 13/053,903, Nov. 28, 2012, Office Action.
U.S. Appl. No. 13/053,903, Apr. 15, 2013, Notice of Allowance.
U.S. Appl. No. 13/173,290, Jan. 3, 2012, Office Action.
U.S. Appl. No. 13/173,290, Mar. 16, 2012, Notice of Allowance.
U.S. Appl. No. 13/227,402, Feb. 10, 2012, Office Action.
U.S. Appl. No. 13/227,402, Aug. 29, 2012, Office Action.
U.S. Appl. No. 13/227,402, Jun. 13, 2013, Office Action.
U.S. Appl. No. 13/227,402, Feb. 2, 2014, Notice of Allowance.
U.S. Appl. No. 13/620,547, Apr. 11, 2014, Notice of Allowance.
U.S. Appl. No. 13/620,906, Feb. 21, 2014, Notice of Allowance.
U.S. Appl. No. 13/621,041, Feb. 5, 2014, Office Action.
U.S. Appl. No. 13/549,205, Jul. 13, 2012, Weigand.
U.S. Appl. No. 11/848,430, Aug. 19, 2013, Notice of Allowance.
U.S. Appl. No. 13/620,547, Nov. 15, 2013, Office Action.
U.S. Appl. No. 13/620,818, Jul. 19, 2013, Office Action.
U.S. Appl. No. 13/612,834, Apr. 28, 2014, Office Action.
U.S. Appl. No. 13/620,820, May 7, 2014, Office Action.

* cited by examiner

TIME-SHIFTING STREAMING DATA

CROSS REFERENCE TO RELATED APPLICATIONS

The present application is a continuation of U.S. application Ser. No. 13/549,205 filed Jul. 13, 2012, which is a continuation of U.S. application Ser. No. 13/173,290 filed Jun. 30, 2011, which is now issued as U.S. Pat. No. 8,224,991, which is a continuation of U.S. application Ser. No. 12/732,929 filed Mar. 26, 2010, which is now issued as U.S. Pat. No. 7,991,911, which is a continuation of U.S. application Ser. No. 11/754,661 filed May 29, 2007, which is now issued as U.S. Pat. No. 7,694,013, which is a continuation of U.S. application Ser. No. 10/090,727 filed Mar. 6, 2002, which is now issued as U.S. Pat. No. 7,237,033, which is a continuation-in-part of U.S. application Ser. No. 09/893,692 filed Jun. 29, 2001, which is now issued as U.S. Pat. No. 7,266,609, and which claims the benefit of and priority to U.S. provisional application No. 60/343,183 filed Dec. 31, 2001 and U.S. provisional application No. 60/286,964 filed Apr. 30, 2001. Each of the aforementioned patent(s) and application(s) are hereby incorporated by reference in their entirety.

TECHNICAL FIELD

This application relates generally to streaming media.

BACKGROUND

The term multimedia streaming describes a process for allowing access to multimedia content from one or more sources. Increased usage of the Internet has resulted in an increased demand for multimedia streaming.

SUMMARY

In one general aspect, data units may be streamed to a terminal by using a duplicating switch to receive a first stream of data units, store content from the first stream, generate second streams that incorporate the stored content, and make the second streams available to the terminals.

Implementations may include one or more of the following features. For example, using the duplicating switch to store content may include storing content that is temporally related to the data units that are being generated. A location identifier may be used to indicate which portion of content is being generated into the second streams. Location identifiers may be used to access the content time-shifted as two different streams. Using the duplicating switch to store content also may include storing more than one instance of the same portion of content, and storing additional instances of the stream as demand for the content increases.

Using the duplicating switch to store content may include storing content and associated header information. Using the duplicating switch to store content also may include storing a checksum describing the content.

A second stream may be transmitted in response to receiving a request from a terminal or a service provider. Storing the content may include using location identifiers to track simultaneous transmissions of a single stored instance of a stream, and making streams available may include transmitting the different data units within the single stored instance to several requestors who have terminals receiving the stream that overlap but differ by a time differential. The duplicating switch may be a specialized device including hardware configured to perform one or more of receiving a first stream of data units, storing content from the first stream, generating second streams, and making the second streams available.

Other features and advantages will be apparent from the following description, including the drawings, and the claims.

DESCRIPTION OF DRAWINGS

Like reference symbols in the various drawings may indicate like elements.

DETAILED DESCRIPTION

Generally, a duplicating switch receives a source stream of data units and stores content of the stream to enable subsequent generation of one or more streams that incorporate the content. Storing the content permits time shifting of the content for subsequent transmission. For example, an on-demand system can be created to transmit stored content from a source stream in response to a user's request. The duplicating switch may use one or more pointers to enable simultaneous access to different portions of content from the same source stream and thus simultaneous generation of several different and offset streams from a single source stream. The duplicating switch may store multiple instances of content from a source stream to manage increased demand. The duplicating switch also may reduce overall storage requirements by storing only certain portions of the content from within a source stream.

For illustrative purposes, FIGS. 1-8 describe a communications system for using a duplicating switch to stream data units to a terminal. For brevity, several elements in the figures described below are represented as monolithic entities. However, as would be understood by one skilled in the art, these elements each may include numerous interconnected computers and components designed to perform a set of specified operations and/or dedicated to a particular geographical region.

Figure 1:
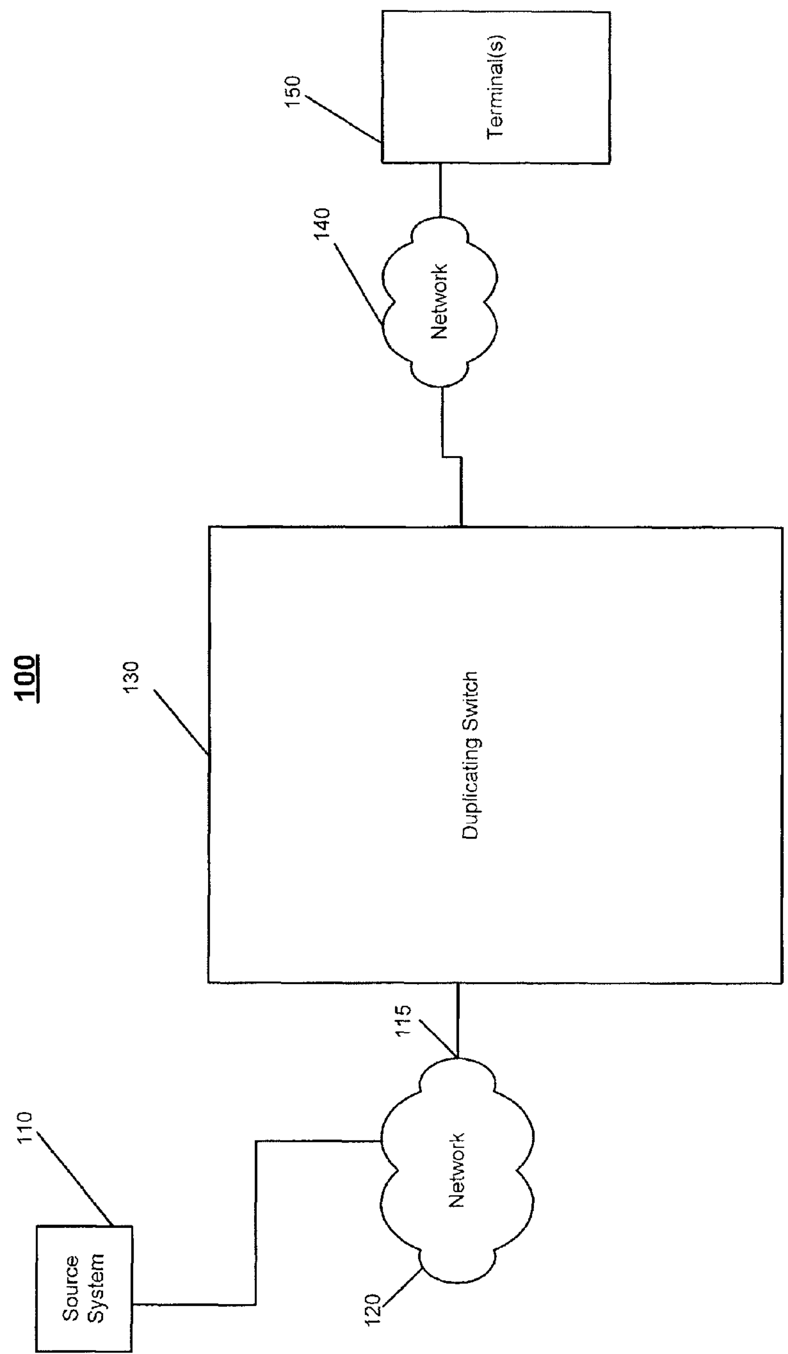
FIG. 1 is a block diagram of a communications system capable of using a duplicating switch to generate a stream of data units.

For illustrative purposes, FIG. 1 depicts a communications system 100 that implements techniques using a duplicating switch to stream data units to two or more terminals. Communications system 100 may be structured and arranged to include a source system 110, one or more terminals 150, and communication software and hardware enabling communications between source system 110 and terminals 150. More particularly, the communications system 100 typically includes the source system 110, a network 120, a duplicating switch 130, a network 140, and terminals 150. In actual implementations, the source system 110 generally transmits one or more data units in a stream of data units across network 120 to one or more duplicating switches 130, where content from the data units is stored, duplicated and transmitted to one or more terminals 150 through network 140 in an on-demand manner.

The source system 110 provides a stream of one or more data units across the network 120 to the duplicating switch 130. Typically, the source system 110 is structured and arranged to convert a media source (e.g., a video or audio feed) into data units for transmission across the network 120. The source system 110 may include a general-purpose computer having a central processor unit (CPU), and memory/storage devices that store data and various programs such as an operating system and one or more application programs. Other implementations of the source system 110 include a workstation, a server, a device, a special purpose device or component, other equipment or some combination thereof capable of responding to and executing instructions in a defined manner. The source system 110 also typically includes an input/output (I/O) device (e.g., video and audio input and conversion capability), and peripheral equipment such as a display communications card or device (e.g., a modem or a network adapter) for exchanging data with the network 120.

Implementations of the source system 110 also may include a media system that transmits one of more pieces of media content across a network 120. For example, a source system 110 may transmit signals formatted according to European Telecommunications Standards Institute (ETSI), Digital Video Broadcasting (DVB), Advanced Television Systems Committee (ATSC), or European Cable Communications Association (ECCA) standards across a network to a cable head end. In another implementation, a cable provider may transmit or direct video signals to a cable head end for distribution in a cable network.

A communications link 115 is used to communicate data between source system 110 and network 120. Communications link 115 may include wired or wireless modes of communication, such as a telephone line, a wireless network link, a cable network, or a direct connection.

The network 120 typically includes hardware and/or software capable of enabling direct or indirect communications between the source system 110 and the duplicating switch 130. The network 120 may include a direct link between the source system 110 and the duplicating switch 130, or it may include one or more networks or subnetworks between them (not explicitly shown). Each network or subnetwork may include, for example, a wired or wireless data pathway capable of carrying and receiving data. Examples of network 120 include the Internet, the World Wide Web, WANs ("Wide Area Network"), LANs ("Local Area Networks"), analog or digital wired and wireless telephone networks (e.g., PSTN ("Public Switched Telephone Network"), ISDN ("Integrated Services Digital Network"), or xDSL ("any form of Digital Subscriber Loop")), radio, television, cable, satellite, and/or other delivery mechanisms for carrying data.

Generally, the duplicating switch 130 is structured and arranged to store a received stream of data units for time-shifted transmission to more than one terminal. Implementations of the duplicating switch 130 may store one or more streams of data units. For example, the duplicating switch 130 may be capable of receiving a stream of IP ("Internet Protocol") video and storing that video for subsequent transmission. Implementations of duplicating switch 130 also may include hardware or software capable of transmitting or receiving media feeds not resembling a stream of data units. For example, the duplicating switch may include a cable head end system that is capable of receiving or transmitting European Telecommunications Standards Institute (ETSI), Digital Video Broadcasting (DVB), Advanced Television Systems Committee (ATSC), or European Cable Communications Association (ECCA) for transmission on a cable distribution system. The cable head end system may receive a satellite broadcast feed, convert the feed into a format suitable for storage, and thereafter convert the feed back to a different format for time-shifted transmission.

The network 140 generally includes one or more of links between the duplicating switch 130 and the terminals 150. For example, the network 140 may include a direct physical link or a series of links connected by various pieces of network equipment. Generally, aspects of network 140 may resemble aspects of network 120. For example, network 120 and network 140 may share one or more hardware or software devices. In another example, networks 120 and 140 may use the same type of circuits and/or equipment.

The terminal 150 may include one or more devices capable of receiving the stream of data units transmitted by duplicating switch 130 through network 140. The terminal 150 may include a controller (not shown) that processes instructions received from or generated by a software application, a program, a piece of code, a device, a computer, a computer system, or a combination thereof, which independently or collectively direct operations of the terminal 150. The instructions may be embodied permanently or temporarily in any type of machine, component, equipment, storage medium, or propagated signal that is capable of being delivered to the terminal 150 or that may reside with the controller at the terminal 150. The terminal 150 may include a general-purpose computer (e.g., a personal computer) capable of responding to and executing instructions in a defined manner, a workstation, a laptop, a PDA ("Personal Digital Assistant"), a wireless phone, a component, other equipment, or some combination of these items that is capable of responding to and executing instructions.

For instance, in one implementation, the terminal 150 includes one or more information retrieval software applications (e.g., a browser, a mail application, an instant messaging client, an Internet service provider client, or an AOL TV ("America Online Television") or other integrated client) capable of receiving one or more data units. The information retrieval applications may run on a general purpose operating system and a hardware platform that includes a general purpose processor and specialized hardware for graphics, communications and/or other capabilities. In another implementation, terminal 150 may include a wireless telephone running a micro-browser application on a reduced operating system with general purpose and specialized hardware capable of operating in mobile environments.

In another implementation, the terminal 150 may include a simplified device capable of receiving a video signal not encapsulated in a traditional data unit. For example, the duplicating switch 130 may transmit a raw video feed formatted in accordance with specifications set forth by, e.g., European Telecommunications Standards Institute (ETSI), Digital Video Broadcasting (DVB), Advanced Television Systems Committee (ATSC), or European Cable Communications Association (ECCA) for transmission directly to a cable tuner or television.

Figure 2:
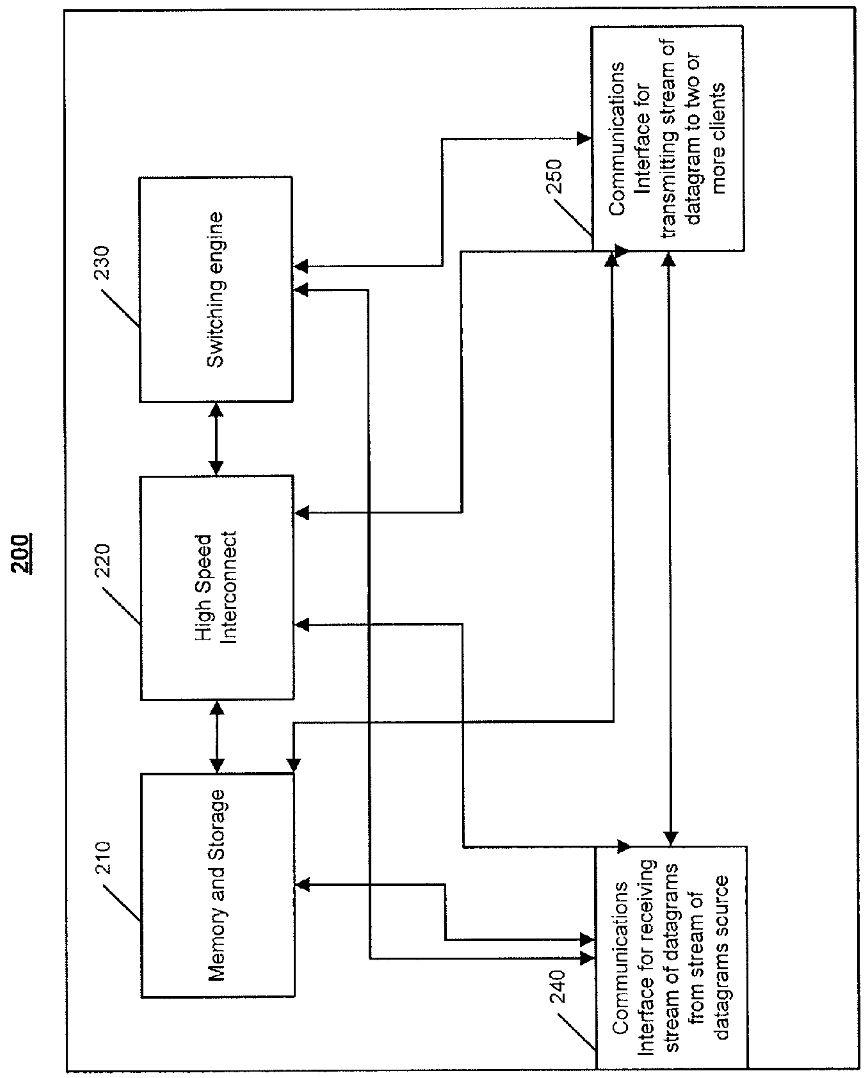
FIG. 2 is an exemplary component diagram of a duplicating switch suitable for use in the communications system of FIG. 1.

FIG. 2 illustrates a duplicating switch 200 structured and arranged to receive a stream, store content from the stream, generate data units from the stream, and transmit the generated data units as a stream. The duplicating switch 200 generally corresponds to the duplicating switch 130 in FIG. 1. The duplicating switch 200 generally includes a storage system 210 for storing the stream of data units, a high speed interconnect 220 between the various subsystems in the duplicating switch 200, a switching engine 230 for modifying and transmitting the stream of data units to two or more clients, a first communications interface 240 for receiving a stream of data units from a source system, and a second communications interface 250 for transmitting a stream of data units to two or more clients.

The storage system 210 enables the duplicating switch 200 to store at least the content portion of the data unit. The storage system 210 may be volatile or nonvolatile and may include memory (e.g., RAM) and/or storage (e.g., HDDS). Implementations of storage system 210 may include a hard disk drive or a more portable media, e.g., a compact disk, a tape drive, or an optical memory device. Implementations also may include combinations of memory and storage.

The high speed interconnect 220 generally refers to a device that connects a component of the duplicating switch 200 with other elements of the duplicating switch 200. Examples of the high speed interconnect 220 may include, but are not limited to, SCSI ("Small Computer Serial Interface"), Fibre Channel, UTOPIA ("Universal Test and Operations PHY interface for ATM ("Asynchronous Transfer Mode")), Infiniband, and other protocols and connection methods. The high speed interconnect may include physical, logical, timing and electrical connections and standards as well as protocols that enable these high speed interconnects to exchange data.

Generally, a switching engine 230 includes a device that performs network operations in hardware (e.g., a chip or part of chip). In some implementations, the switching engine 230 may include an ASIC ("Application Specific Integrated Circuit") implementing network operations logic directly on a chip (e.g., logical gates fabricated on a silicon wafer then manufactured into a chip). For example, an ASIC chip may include a logical gate structure implemented in silicon and configured to receive a packet and filter based on examining an IP address.

Implementations of the switching engine 230 may include using a FPGA ("Field Programmable Gate Array"). An FPGA generally is defined as a chip fabricated to allow third parties to implement a variety of logical designs (e.g., group of gates) on the chip. For example, one designer may load a design that replaces the IP address of received IP packets with a different IP address. Another example may include a design that performs segmentation and reassembly of IP packets as they are modified during transmission of the IP packet through different networks.

Implementations of the switching engine 230 may include using a network processor. A network processor generally is defined as a chip that, among other features, allows software to specify which network operations should be performed. One example of a network processor may include several interconnected RISC ("Reduced Instruction Set Computer") processors fabricated in a network processor chip. The network processor chip may implement on some of the RISC processors software that change an IP address of an IP packet. Other RISC processors in the network processor may implement software that controls which terminals receive an IP stream.

The switching engine 230 may include a precoder (not shown) that is structured and arranged to receive a data unit, extract a content piece from the payload portion of the data unit, determine where the content piece will be stored, and store the content piece in a structured manner so that retrieval (e.g., playback) involves retrieving neighboring content pieces, packaging data units around the content pieces, and transmitting the data units to one or more requestors. This process will be described further with respect to FIG. 4.

The first communications interface 240 generally is structured and arranged to receive a stream of data units from a device such as the source system 110. Implementations of the communications interface may include a LAN or WAN interface with the ability to direct the data units to one or more locations in the duplicating switch 200, using, for example, the high speed interconnect 220. Implementations also may include other forms of transmitting a media signal, including ETSI, DVB, ATSC, or ECCA.

The second communications interface 250 generally is structured and arranged to transmit a stream of data units from the memory system 210 to one or more devices that generally correspond with recipients, such as terminal 150 described with respect to FIG. 1. Implementations of the second communications interface 250 may include a LAN or WAN interface with the ability to direct the data units to one or more locations in the duplicating switch 200 using, for example, the high speed interconnect 220. Implementations also may include other forms or transmitting a media signal other than by IP networking. In addition, the second communications interface 250 is not limited to the same type of format as the first communications interface 240, though they may include the same format and even the same physical interface. For example, the first communications interface 240 may include a POS ("Packet-over-SONET") interface while the second communications interface 250 may include some form of Ethernet (e.g., 100-Base-T, Gigabit Ethernet).

Figure 3A:
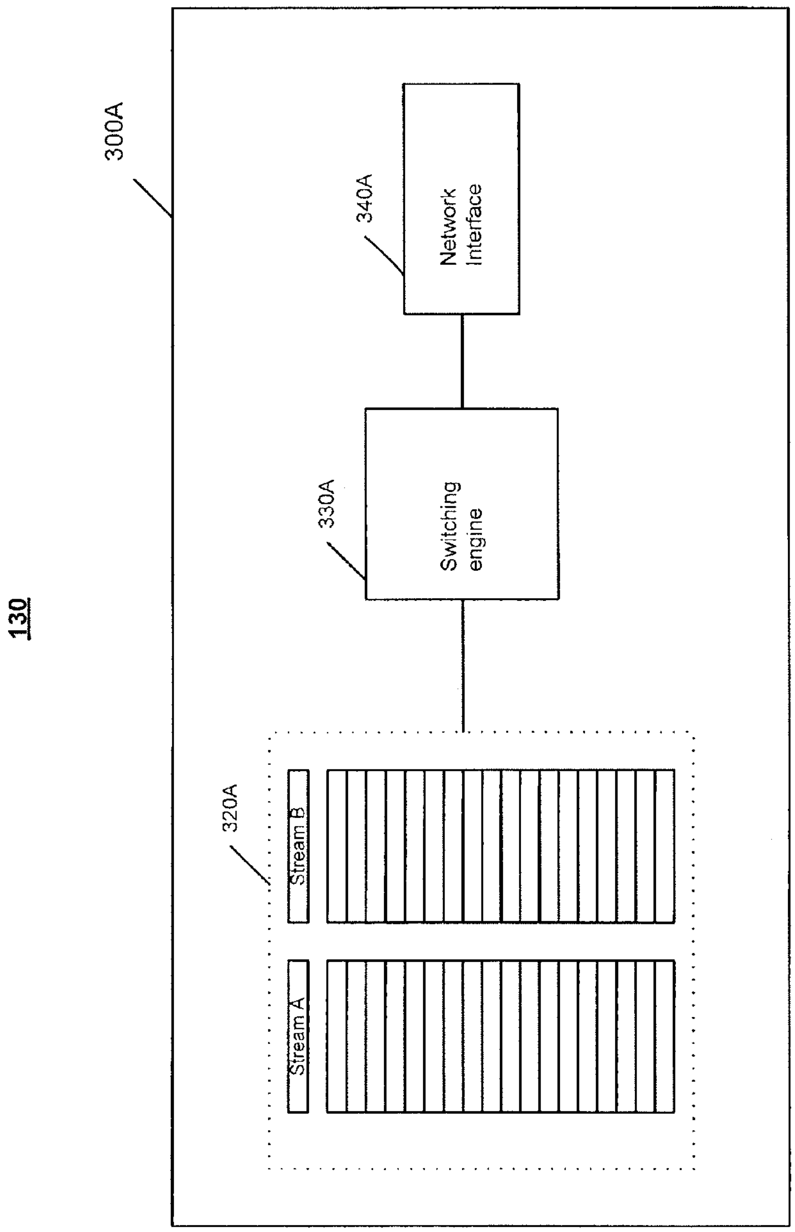
FIG. 3A is an exemplary block diagram of a duplicating switch that uses memory (e.g., RAM ("Random Access Memory")) to store a media stream for subsequent playback.

FIG. 3A provides an exemplary block diagram of a duplicating switch (e.g., duplicating switch 130 in FIG. 1) with a memory implementation. The duplicating switch 300A includes a RAM array 320A, a switching engine 330A and a network interface 340A.

The RAM array 320A may include one or more RAM memory banks structured and arranged to store one or more pieces of content. The RAM array 320A may store just a portion of the stream of data units. For example, a provider streaming out a movie may store one portion of the movie for several users to watch at one time. The RAM array 320A may store a window (e.g., a ten-minute window) of the movie that a user may use to time-shift the movie (e.g., pause, stop playing, or rewind) while staying current with the movie being broadcast.

Within the RAM array 320A, there may be location identifiers to keep track or indicate which content piece to package and/or transmit to a terminal. For example, an OSP ("Online Service Provider") may schedule a stream of data units to be transmitted to terminals at a certain time. In one example, the duplicating switch loads a portion of the stream of content pieces indicated by the location identifier to the RAM array 320A. In this example, the duplicating switch may use one or more pointers to indicate which content pieces (e.g., frames) should be transmitted to which user. In another example, an on-demand system may load a larger portion of the content pieces to memory and may use a first pointer to transmit one stream of data units and a second pointer to transmit a second stream of data units simultaneously or otherwise.

The switching engine 330A is structured and arranged to manage the content being stored in and retrieved from the RAM array 320A. Aspects of the switching engine 330A generally correspond to aspects of the switching engine 230 in FIG. 2. The switching engine 330A generally loads and retrieves content to/from the RAM array 320A. Examples of content that may be loaded and retrieved by switching engine 330A include content pieces without wrappers (e.g., OSI wrappers), such as datagrams having MPEG ("Motion Picture Experts Group") I, P, and B frames removed, video frames and differential checksum values that describe frame-to-frame changes and frames with one or more added wrappers (e.g., a layer 4 datagram). In one implementation, the switching engine 330A may implement a system of pointers designed to keep track of where in time or sequence number the terminals are with respect to the available stored content. The switching engine 330A may include a device, a program, a software controller, or another system or device in combination with the above. In another implementation, the switching engine 330A may manage overall system utilization and refuse subsequent requests for services or attempt to serve more than one terminal from one stream of data units.

The network interface 340A is designed to transmit and receive a stream of data units and generally corresponds to the first communications interface 240 and second communications interface 250 described in FIG. 2.

Figure 3B:
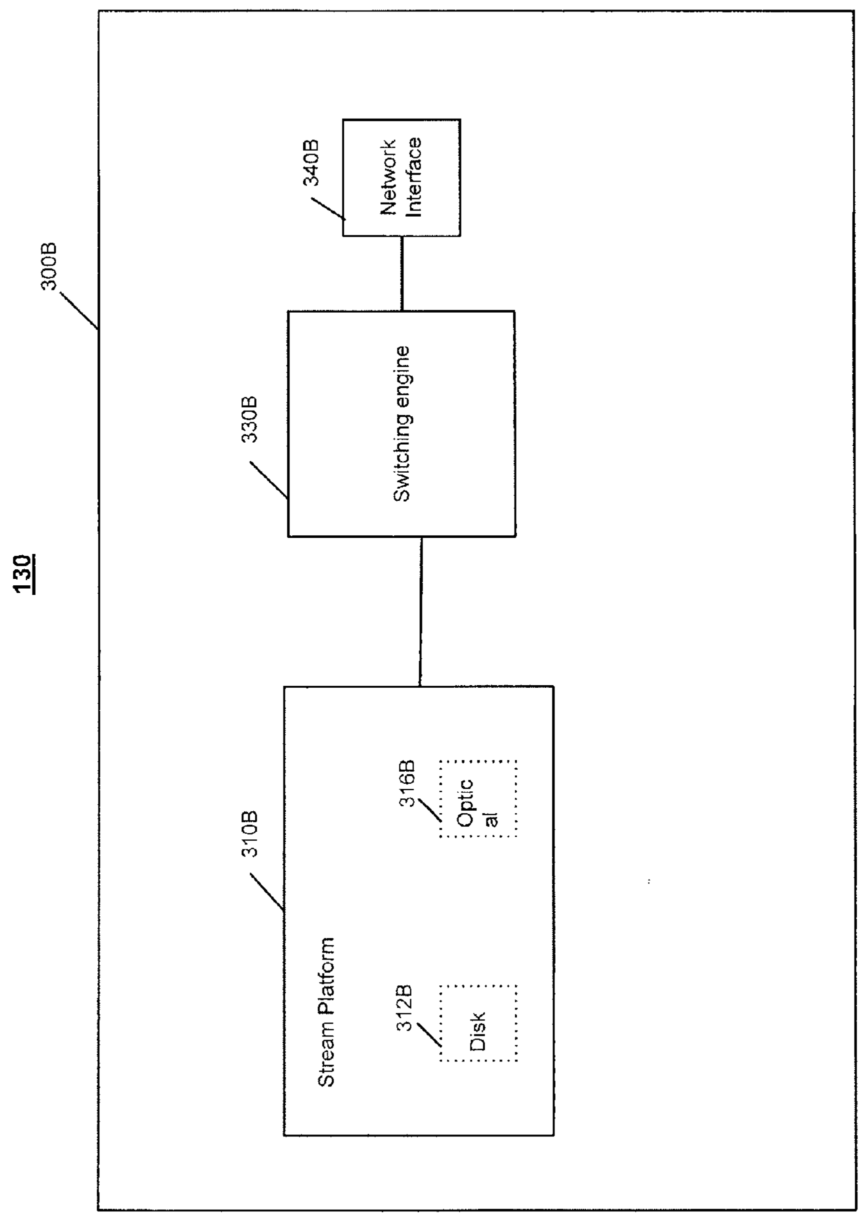
FIG. 3B is an exemplary block diagram of a duplicating switch that uses storage to store a media stream for subsequent playback.

FIG. 3B provides another exemplary block diagram of a duplicating switch 300B with a storage implementation. The duplicating switch 300B includes a stream platform 310B, a switching engine 330B, and a network interface 340B.

The stream platform 310B is structured and arranged to store content from within a stream of data units. The stream platform 310B includes a hard disk drive 312B (or a tape drive or other magnetic memory) and optical memory 316B. Generally, the stream platform 310B includes memory components with low bandwidth performance but high capacities. For example, storage may include solid-state-memory (not shown) that is slower than solid-state memory used in other applications. Typically, because of the greater storage available with less bandwidth, the stream platform 310B will store a larger portion of a stream (e.g., a movie), but will limit access to fewer simultaneous streams absent RAM or other cache interfaces.

Implementations of the storage platform 310B may include the disk storage 312B having a RAM interface to the switching engine 330B. For example, the duplicating switch may include a RAM bank and disk storage. Content pieces may be loaded to the disk storage such that the content pieces are retrieved in the order that they are transmitted. As the content pieces are being retrieved, they are loaded to the RAM bank. The higher throughput performance of the RAM banks may enable more terminals to access the same content piece. Terminals accessing the stream of data units may use a pointer to the content pieces in the RAM bank to keep track and load the data units they need in the stream of data units.

The switching engine 330B is structured and arranged to manage the content being stored and retrieved in the stream platform 310B. The switching engine 330B generally corresponds to the switching engine 330A described with respect to FIG. 3A. The network interface 340B is designed to transmit and receive a stream of data units and generally corresponds to the first communications interface 240 and second communications interface 250 described with respect to FIG. 2.

The RAM-based and storage-based systems described with respect to FIGS. 3A and 3B illustrate implementations that are designed to account for common limitations of the existing memory and storage systems (e.g., solid-state RAM offers high throughput but less storage while hard drives and optical memory offer higher storage but less throughput). However, implementations are not limited to those shown, nor are memory or storage devices necessarily subject to these constraints. For example, a disk drive may be used to implement a system managing multiple pointers and may offer higher bandwidth, while solid-state memory may offer higher density storage than the disk drive storage.

Figure 4:
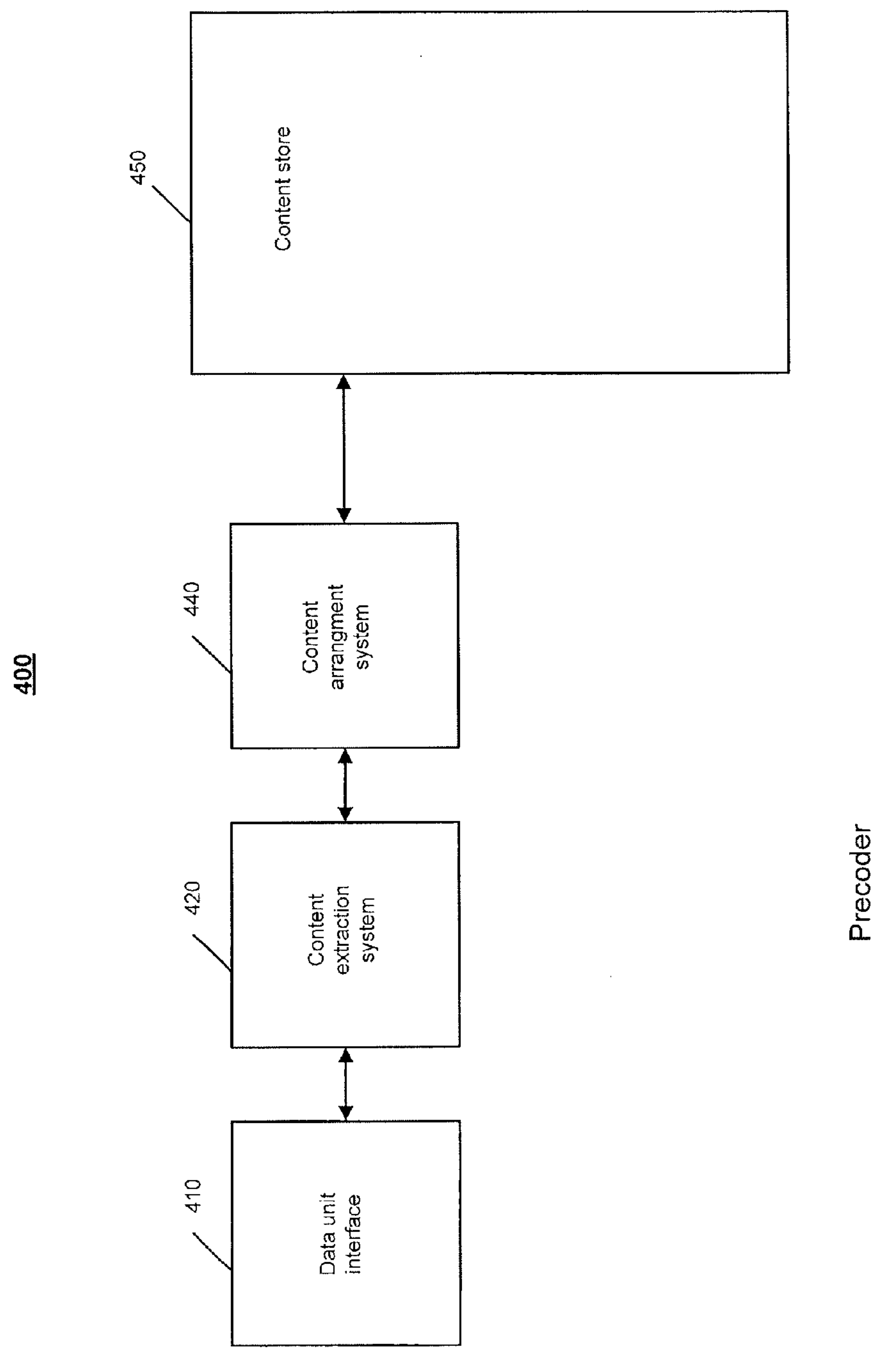
FIG. 4 is a block diagram of a precoder for use in a duplicating switch.

FIG. 4 shows an example of a duplicating switch 400 with precoder functionality. The duplicating switch 400 generally corresponds to the duplicating switch 130 of FIG. 1. The duplicating switch 400 includes a data unit interface 410, a content extraction system 420, a content arrangement system 440, and a content store 450.

The data unit interface 410 generally is structured and arranged to interface with a network to transmit and receive a data unit from the content store 440. Generally, the functionality of the data unit interface 410 corresponds to the functionality of the first communications interface 240 and the second communications interface 250 of FIG. 2. Data unit interface 410 also may be configured to segment and reassemble a data unit that has been separated during transmission, or to handle unconventional data units. For example, the data unit interface 410 may be configured to transmit/receive one or more media frames (e.g., frames formatted according to one of ETSI, DVB, ATSC, or ECCA). In one instance, if the duplicating switch 400 receives an analog signal, the data unit interface 410 may convert the signal to a recognized format that the frame or content piece may store.

The content extraction system 420 is structured and arranged to remove a data unit wrapper that is added around content for transmission. For example, the content extraction system 420 may remove one or more bits associated with OSI ("Open Systems Interconnect") information encapsulated along with the content for transmission. The content extraction system 420 also is capable of adding the wrapper when the data is retrieved from the content store 450 for subsequent transmission. For example, the content extraction system 420 may remove wrapper information when storing a stream of data units in the content store 450 and may add a different wrapper when transmitting the stream of data units from the content store 450.

The content arranger 440 is structured and arranged to direct storage and retrieval of the content information such that the content information may be retrieved in a determinate manner. For example, the content may be arranged so that the addressing information may be updated in predictable increments. In another example, the content may be arranged such that the difference between frames of content may be calculated by analyzing an associated checksum that then may be stored.

Determining where a content piece may be stored and storing the content piece may include using hard disk drive constraints to store the content piece. For example, the content store 450 (e.g., hard drive) may store the content pieces such that the same "read" or data retrieval will retrieve related content pieces that are frequently transmitted in close proximity to one another (e.g., adjacent frames in a movie or adjacent I, P, and B MPEG frames).

Determining where a content piece may be stored and storing the content piece may include using solid-state storage (e.g., various forms of RAM) to store the content piece.

For example, the solid-state storage may store all or a portion of the stream in an array of RAM memory. If a portion of the RAM memory is used to store the content piece, the RAM may load a certain window of content for transmission to one or more terminals. In some implementations, the duplicating switch may store more than one instance of the stream of data units in the array of RAM.

The content store 450 is structured and arranged to store content pieces or frames. As described above with respect to the content arranger 440, the content is generally structured and arranged to be retrieved in a manner enabling transmission of related content pieces to one or more terminals. The content store 450 generally corresponds to the memory system 210 of FIG. 2, the RAM array 320A of FIG. 3A, and the storage platform 310B of FIG. 3B.

Figure 5:
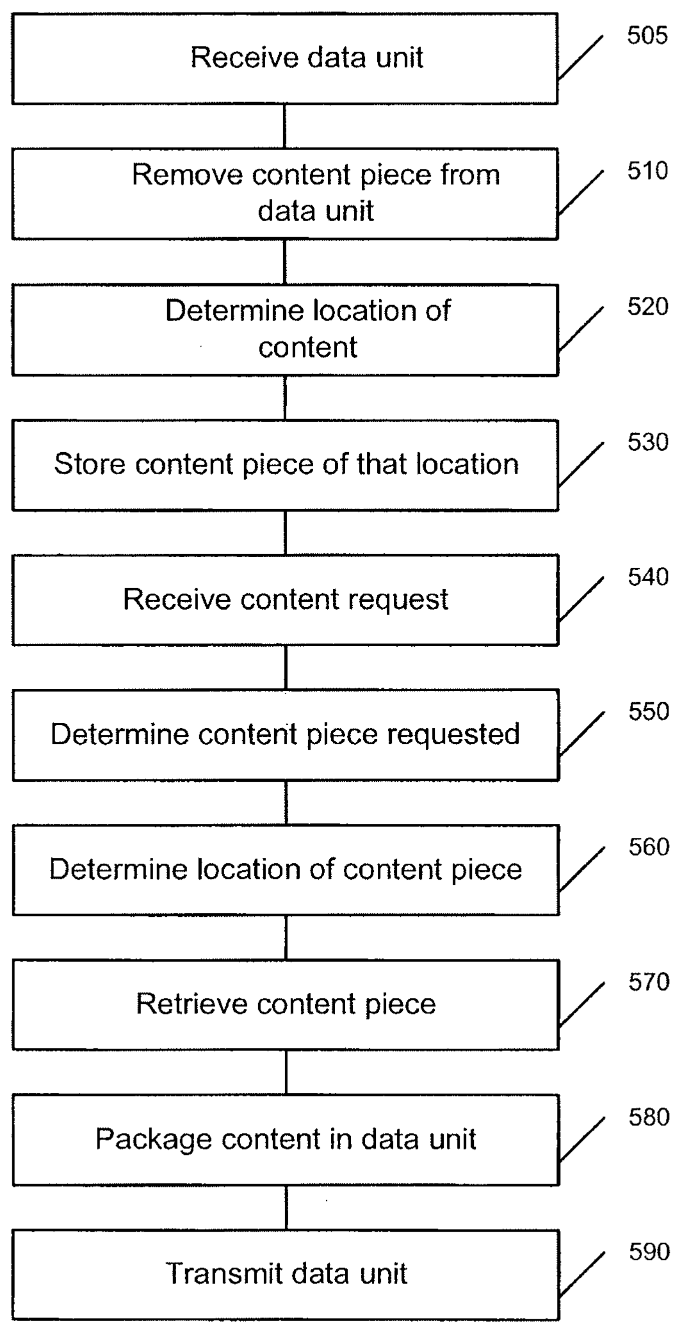
FIG. 5 is a flow chart of a procedure for processing a received data unit using a duplicating switch in a communications system, such as the communications system of FIG. 1.

FIG. 5 illustrates a procedure 500 for storing and transmitting a data unit using a duplicating switch. In general, the procedure 500 may be performed using one of the duplicating switches described with respect to FIGS. 1-4.

Initially, the duplicating switch receives a data unit (step 505) and selects the content piece from the data unit (step 510). Typically, selecting the content piece of the data unit involves identifying fields or portions of the data unit that correspond to the content, and removing some or all aspects not related to the content. For example, a duplicating switch may remove one or more layers of an OSI ("Open Systems Interconnection") header and store the remainder of the data unit as the content piece. In another example, selecting the content may include creating or modifying location identifiers to identify which portion of the data unit should be stored when the data unit is loaded to memory.

Selecting the content may include enabling one or more portions of other aspects of the data unit to be retained with the content. For example, one or more fields of the OSI header may be preserved and stored as content.

Implementations may include using a pre-coder to modify or adjust the content for storage. For example, the pre-coder may compress the content so that less bandwidth is consumed during transmission. In another example, the pre-coder may calculate a checksum or shortcut describing intra-content differences. This checksum or shortcut may be stored in place of storing some of the content pieces.

The duplicating switch determines the location in the memory system in which to store the content piece (step 520). Typically, the location for storage of the content piece is selected so that related content pieces may be retrieved in related operations. Examples of related content may include sequential frames in a video and/or content in a time slice. The duplicating switch then stores the content piece in the determined location (step 530).

At some later time, the duplicating switch receives a request for a content piece (step 540). Receiving a request for a content piece may include having a user (e.g., terminal 150 in FIG. 1) request a video stream for display on the user's home computer. Implementations also may include having other devices request the content piece. For example, a cable modem acting as a set top box may request a content piece for display to a television.

Implementations also may include having a request originate from a source other than the intended destination. For example, a cable system administrator may generate a request for the content piece on behalf of one or more subscribers.

The duplicating switch 130 determines which content piece has been requested (step 550). The requestor may designate a content piece to send. For example, a terminal may keep track of which content has been received, and may generate a request for one or more pieces of content (e.g., frame number 100 is missing). Implementations also may include having the duplicating switch track which content piece is required. For example, a duplicating switch may attempt to transmit the same content piece to several users.

The duplicating switch 130 determines where the content piece is located (step 560). To do so, the duplicating switch may use the location identifiers described with respect to FIGS. 2 and 3. Other implementations may employ a file and/or an archiving system maintained to manage access to content pieces.

The duplicating switch 130 retrieves the content piece (step 570). The duplicating switch may do so by reading a memory location specified by a location identifier. Other implementations may include retrieving multiple pieces of content information (e.g., reading a sector on a disk).

The duplicating switch 130 packages the content piece in a data unit (step 580). For example, the duplicating switch may add one or more layers of OSI information (e.g., addressing information). Implementations where one or more aspects of the data unit other than content are stored with the content piece may include modifying one or more parameters in those fields. For example, if an Internet Protocol packet is stored, the destination address may be modified to the addresses of requesting users.

Finally, the duplicating switch transmits the data unit to one or more terminals (step 590). The data unit may be transmitted in formats other than IP addressing. For example, transmitting the data unit may include transmitting an on-demand channel over a network.

Figure 6:
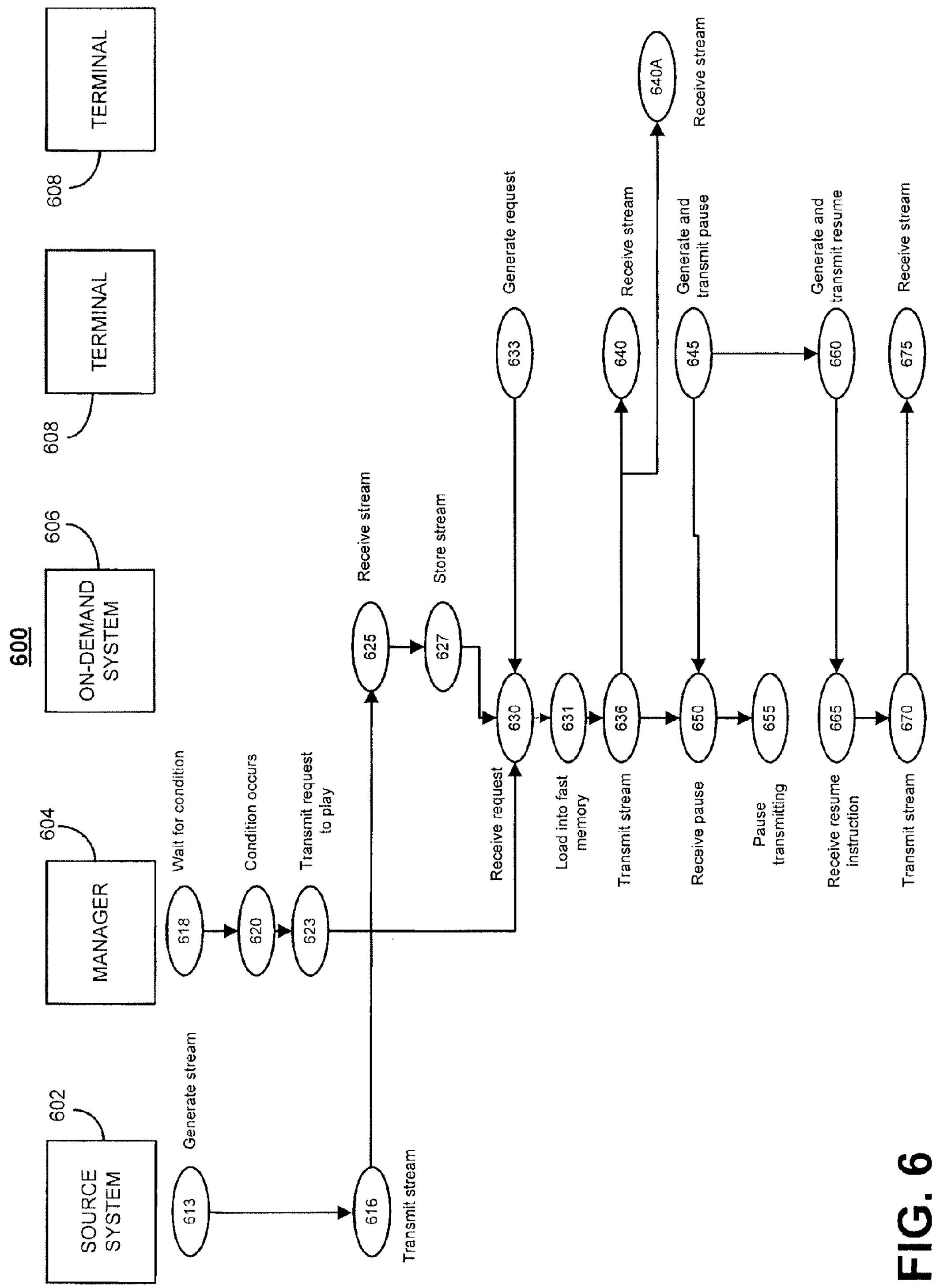
FIG. 6 is a flow chart of a procedure for providing a stream of data units in a communications system, such as the communications system of in FIG. 1.

The function of a communications system 600 will now be described with respect to FIG. 6. Communications system 600 generally includes a source system 602, a manager 604, a duplicating switch 606, and terminals 608 and 610. In general, the source system 602 corresponds to the source system 110 of FIG. 1, duplicating switch 606 corresponds to duplicating switch 130 in FIG. 1, and terminals 608 and 610 correspond to terminals 150 of FIG. 1. The manager 604 may include a cable system operator, an OSP, a content provider, or an entity capable of providing instructions or direction to the duplicating switch 606.

As shown, the source system 602 generates a stream of data units (step 613). The source system 602 transmits the stream of data units to the duplicating switch 606 (step 616).

The duplicating switch 606 receives the stream of data units (step 625). The duplicating switch 606 then stores at least the content pieces from the stream of data units (step 627).

The stream may be transmitted in a variety of ways. In some implementations, the manager 604 waits for a condition to occur (step 618). For example, the manager may be a scheduler that is programmed to direct a duplicating switch "broadcast." When the condition occurs (step 620), the manager 604 transmits a request to the duplicating switch 606 to transmit the stream of data units (step 623).

Alternatively, a terminal 608 may generate a request for a stream (step 633). For example, the terminal 608 may generate a request to view a particular video stream. The duplicating switch 606 receives the request (step 630).

In an implementation generally corresponding to the system described with respect to FIG. 3B, the duplicating switch 606 may load one or more content pieces into fast memory (e.g., RAM) (step 631). For example, the duplicating switch 606 may determine that there is inadequate bandwidth to the existing storage of the content and may load frequently-accessed content pieces to the faster memory to increase capacity.

Regardless of the mechanism used to indicate when to transmit the stream of data units to a terminal, the duplicating switch 606 may transmit the stream of data units to two or more terminals 608, 610 (step 636). In some implementations, a terminal receives a stream that has been broadcast or otherwise automatically transmitted to the stream recipient without requesting the stream of data units. In either case, terminals 608 and 610 receive the stream of data units (step 640 and 640A). Depending on the implementation, a different "stack" of content pieces may be loaded into memory to support terminal 610.

In some implementations, the terminal 608 may generate and transmit a pause message (step 645). For example, a terminal may wish to "pause" a video on-demand stream and return to the stream at a later point. When the duplicating switch 606 receives the pause message (step 650), the duplicating switch 606 pauses transmitting to the terminal 608 (step 655). The duplicating switch 606 may still transmit a stream of data units to terminal 610 (not shown). The pause message may be implemented in a variety of ways. For example, terminal 608 may keep track of which data units have been received and resume where it left off by generating and transmitting a resume message (step 660). Another example may include having the terminal 608 transmit a stop message and the duplicating switch 606 keep track of where to resume when the transmit resume message is received (step 660).

If and when the duplicating switch 606 receives the resume message (step 665), the duplicating switch 606 transmits the stream of data units 670 to the terminal (step 670). The terminal 608 then receives the stream of data units (step 675).

Figure 7A:
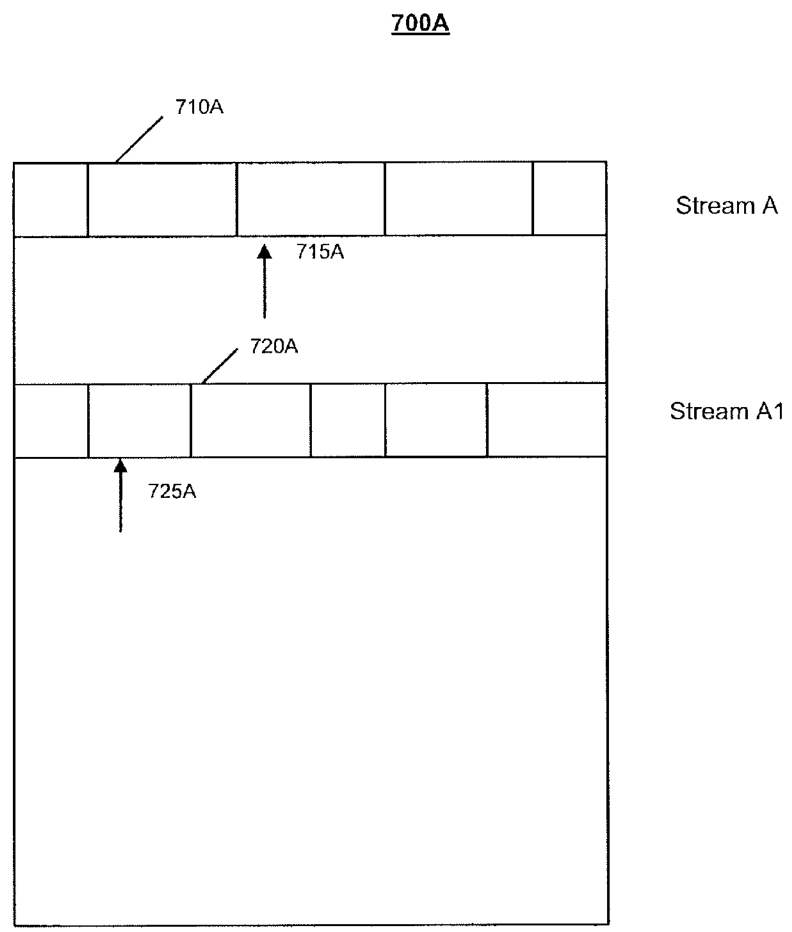
FIG. 7A illustrates a duplicating switch structured and arranged to store multiple instances of a stream of data units.

FIG. 7A depicts a duplicating switch 700A structured and arranged to store multiple instances of the stream of data units. The duplicating switch 700A transmits two streams of data units, stream A and stream $A^1$. Stream A occupies memory storage 710A in the memory bank, while stream $A^1$ occupies memory storage 720A in the memory bank. In one implementation, a first pointer 715A to the memory storage 710A indicates which content piece, relative to other content pieces, should be encapsulated as a data unit and transmitted to a terminal requesting Stream A. As mentioned previously, implementations may include storing a portion of the content pieces in the memory bank. For example, if problematic network conditions prevent a terminal from receiving some of the stream of data units, the terminal may not receive some of the content pieces and may experience gaps in receiving the stream of data units (e.g., missing time in a movie).

A second pointer 725A to the memory storage 720A indicates which portions of content pieces encapsulated in a stream of data units are being transmitted to several terminals. One or more terminals wishing to receive one or more data units in the stream of data units receive the content piece corresponding to the second pointer 725A, which is continuously advanced to the next content piece. In some implementations, the second pointer 725A may advance several content pieces and encapsulate more than one content piece in a data unit.

Figure 7B:
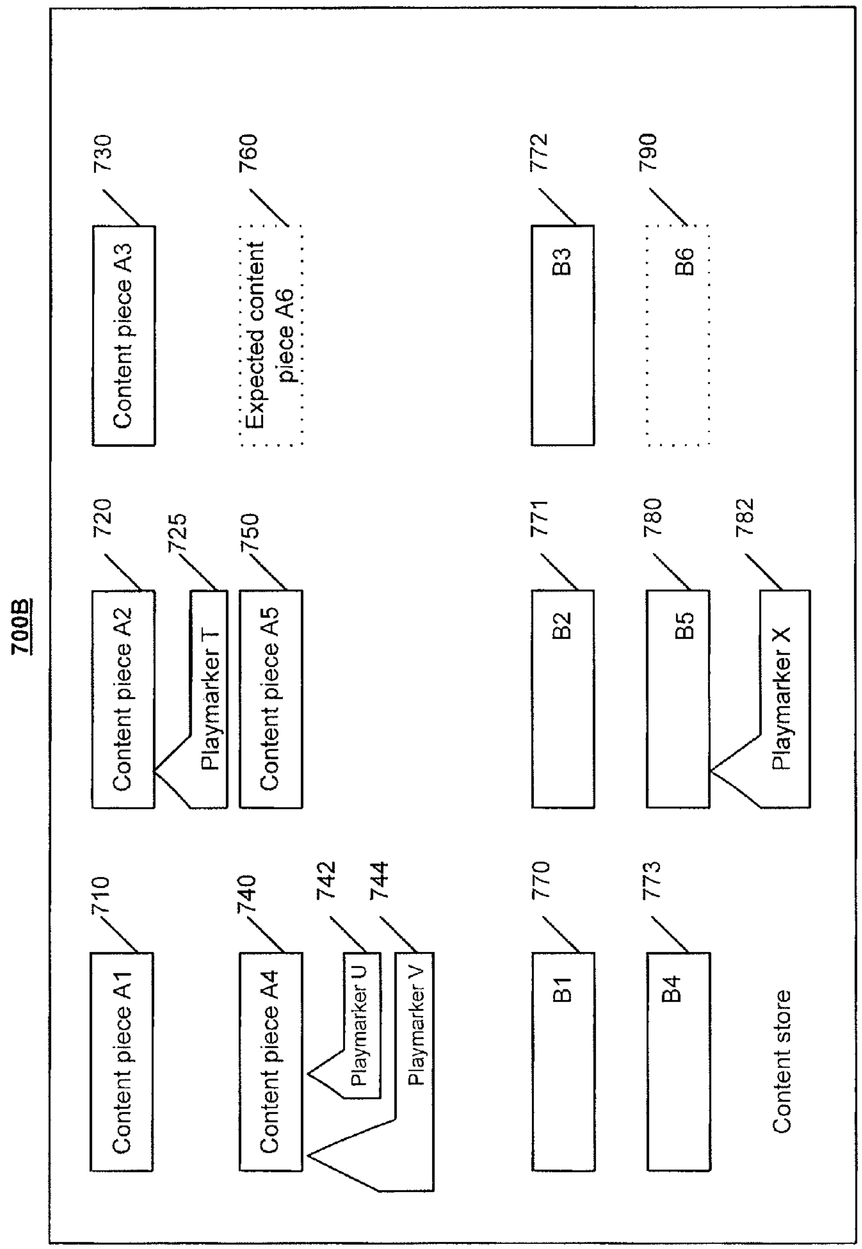
FIG. 7B illustrates a duplicating switch structured and arranged to store multiple location identifiers.

FIG. 7B depicts a duplicating switch 700B structured and arranged to store multiple location identifiers. In this example, duplicating switch 700B includes five content pieces in stream A: A1 710, A2 720, A3 730, A4 740, and A5 750. Duplicating switch 700B also includes an area of memory allocated for an expected content piece A6 760.

In one example, the duplicating switch 700B enables each of terminals T, U and V to receive its own stream of data units. Each of the terminals manages a location identifier (e.g., pointer) to direct the duplicating switch to select the appropriate content piece to be transmitted. For example, terminals T, U, and V may begin by requesting content piece A1 710 simultaneously.

After some content pieces have been transmitted, and as shown in FIG. 7B, the location identifier 725 for terminal T may be referencing content piece A2 720, while the location identifier 742 and the location identifier 744 for terminals U and V are referencing content piece A4 740 that corresponds to a different time-shift than content piece A2. This offset may have occurred because, for example, terminal T paused receipt of the stream of data units, and is now receiving content pieces that are delayed relative to those received by terminals U and V.

In another example, duplicating switch 700B includes five content pieces in stream B: B1 770, B2 771, B3 772, B4 773, and B5 780. Duplicating switch 700B also includes an area of memory allocated for an expected content piece B6 790. In one implementation, stream B may be part of the same stream of data units as stream A, but may correspond to a different portion of the stream of data units. For example, stream A may be a "video" stream 40 minutes into a video stream while stream B is five minutes into the same video stream. In another example, stream B may be identical to stream A but was added to implement better system performance. In yet another example, stream A and stream B may represent completely different video streams (e.g., two different television channels).

Figure 8:
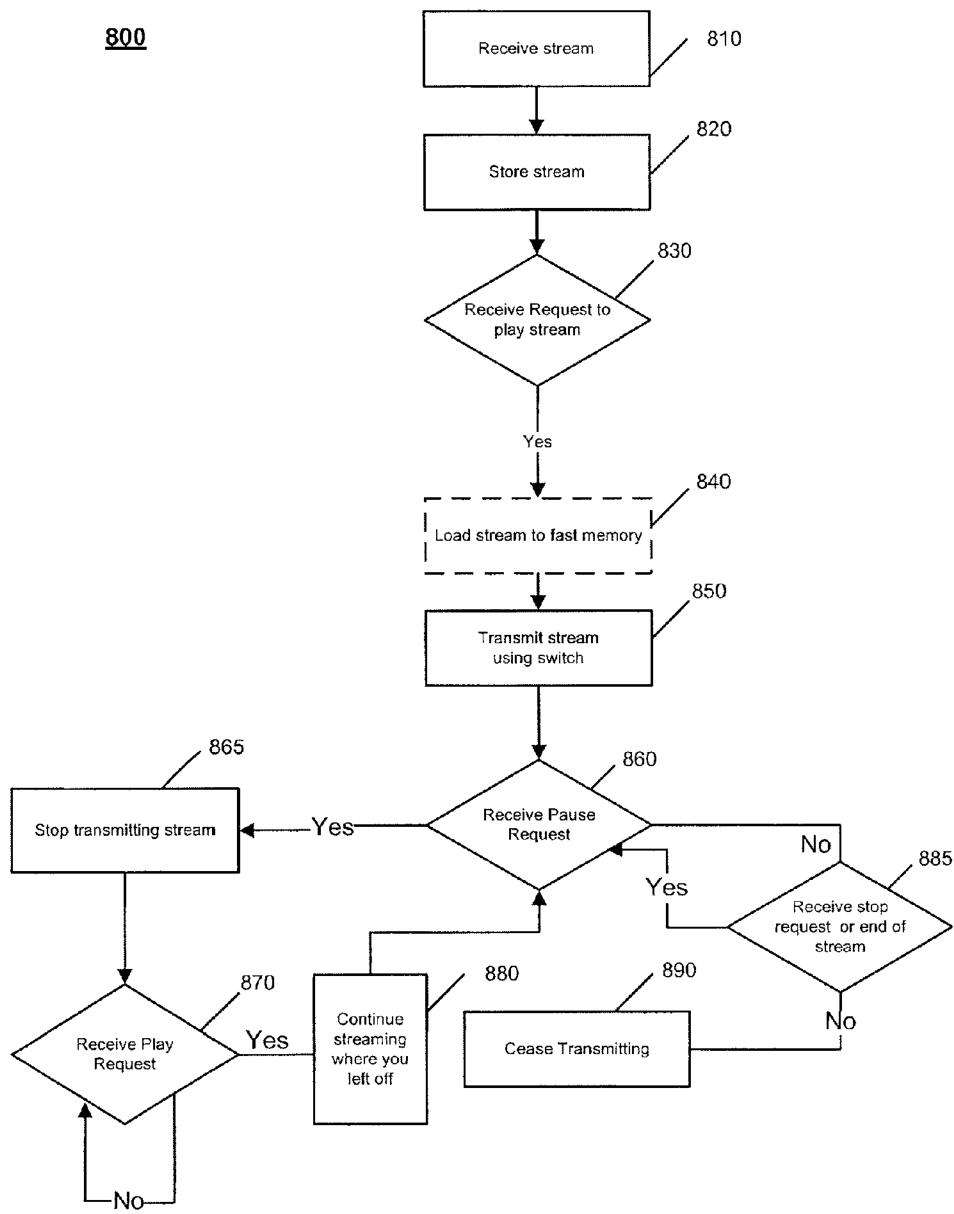
FIG. 8 is a flow chart of a procedure for time-shifting content in a communications system, such as the communications system of FIG. 1.

FIG. 8 illustrates a procedure 800 for implementing a "Pause" function on a duplicating switch, such as the duplicating switches described with respect to FIGS. 1-7. Initially, the duplicating switch receives a stream of data units (step 810) and stores content pieces from the stream of data units (step 820). With the content stored and ready for transmission, the duplicating switch waits to receive a request to play the stream of data units (step 830). Though the duplicating switch may wait for a request-to-play message, in some implementations, the duplicating switch may begin to transmit (e.g., play) upon receipt of the stream. In this configuration, the content might only be stored when a user requests pausing of the stream.

In an optional implementation, the duplicating switch may load the stream (content pieces) to fast memory (step 840). This generally corresponds to loading the stream to fast memory as described with respect to FIG. 6.

The duplicating switch transmits the stream of data units (step 850). While transmitting the stream, the duplicating switch 130 may receive a pause request (step 860). If the duplicating switch 130 receives a pause request, the duplicating switch stops transmitting the stream of data units to the terminal (step 865). With the stream of data units paused, the duplicating switch 130 may wait to receive a play request (step 870).

If the play request is received, the duplicating switch 130 continues to transmit the stream of data units where the terminal left off (step 880). If not, the duplicating switch 130 waits for the resume request. When the terminal resumes receiving the stream of data units, the duplicating switch checks for a new pause request (step 860).

If the duplicating switch 130 does not receive a pause request, the duplicating switch may receive a stop request or reach the end of the stream (step 885). If the stop request is received or the end of the stream of data units is reached, the duplicating switch ceases transmitting (step 890). If not, the duplicating switch 130 continues transmitting and returns to waiting for a pause request (step 860).

Ceasing transmitting may include automatically selecting another stream of data units to be transmitted. For example, the duplicating switch 130 may select another video to transmit when one video ends.

An "instant replay" or rewind feature may be created using a similar process, except instead of resuming transmission of a stream where the stream was produced, the stream is retransmitted time-shifted to an earlier moment in the stream (e.g., 30 seconds for a commercial, 15 seconds for a sporting event). For example, the duplicating switch may load content from memory representing the stream 30 seconds earlier, and may transmit that content beginning at the earlier location (continuing on from that point).

Other implementations are within the scope of the following claims. In particular, in some implementations, the terminal includes a set top tuner set to receive an analog signal. Also, the location identifiers described in FIG. 8 may be maintained on the client, or on a separate server or device to indicate which content piece the terminals may be receiving.

The source, network, on-demand-system, and terminal also may be distributed across different entities in the communication system, and may make use of one or more agents and/or proxies to perform certain functions.

What is claimed is:

1. A method comprising:

receiving, by a duplicating switch, a non-time-shifted video stream from a video stream source;

storing a first instance of the non-time-shifted video stream in a non-transitory storage medium of the duplicating switch;

sending the non-time-shifted video stream to a first terminal and to a second terminal;

receiving, by the duplicating switch, a request from the first terminal to time-shift the non-time-shifted video stream at an intermediate point in the video stream;

duplicating and storing, using at least one processor, a portion of the non-time-shifted video stream as a second instance of the non-time-shifted video stream in the non-transitory storage medium, the second instance of the non-time-shifted video stream being less than the entire non-time-shifted video stream; and time-shifting, using at least one processor, the second instance of the non-time-shifted video stream being sent to the first terminal starting at the intermediate point in the non-time-shifted video stream.

2. The method as recited in claim 1, wherein time-shifting, using at least one processor, the second instance of the non-time-shifted video stream comprises pausing the video stream.

3. The method as recited in claim 1, wherein time-shifting, using at least one processor, the second instance of the non-time-shifted video stream comprises rewinding from one point in the stored portion of the second instance of the non-time-shifted video stream to a previous point in the stored second instance of the non-time-shifted video stream.

4. The method as recited in claim 1, wherein receiving the request from the first terminal to time-shift the non-time-shifted video stream comprises receiving a pause request.

5. The method as recited in claim 4, further comprising transmitting of the second instance of the time-shifted video stream from the paused point in the time-shifted video stream.

6. The method as recited in claim 1, wherein sending the non-time-shifted video stream to the second terminal comprises sending the first instance of the non-time shifted video stream to the second terminal while allowing for time-shifting by the first terminal.

7. The method as recited in claim 6, further comprising:

time-shifting, using at least one processor, the first instance of the non-time-shifted video stream being sent to the second terminal using the stored portion of the non-time-shifted video stream, wherein the first instance of the non-time-shifted video stream sent to the second terminal is time-shifted in a first manner while the second instance of the non-time-shifted video stream sent to the first terminal is time-shifted in a second manner.

8. The method as recited in claim 1, wherein receiving a non-time-shifted video stream comprises receiving a stream of a movie from a video stream source.

9. The method as recited in claim 8, wherein storing the second instance of the non-time-shifted video stream in the non-transitory storage medium comprises storing approximately a ten minute window of the movie in the non-transitory storage medium.

10. The method as recited in claim 1, wherein time-shifting the second instance of the non-time-shifted video stream being sent to the first terminal comprises sending the second instance of the non-time-shifted video stream to the first terminal upon receiving an on-demand request from the first terminal.

11. The method as recited in claim 1, wherein time-shifting the second instance of the non-time-shifted video stream being sent to the first terminal comprises sending the second instance of the non-time-shifted video stream to a television.

12. The method as recited in claim 1, wherein time-shifting the second instance of the non-time shifted video stream to the first terminal comprises sending the second instance of the non-time-shifted video stream to a mobile device.

13. The method as recited in claim 12, wherein sending the second instance of the non-time-shifted video stream to the first terminal comprises sending the second instance of the non-time-shifted video stream to a wireless phone.

14. The method as recited in claim 1, wherein time-shifting the second instance of the non-time-shifted video stream being sent to the first terminal comprises sending the second instance of the non-time-shifted video stream to a set top device.

15. The method as recited in claim 1, further comprising storing the portion of the second instance of the non-time-shifted video stream in the non-transitory storage medium only upon receiving the request from the first terminal to time-shift the non-time shifted video stream.

16. The method as recited in claim 1, wherein time-shifting the second instance of the non-time-shifted video stream comprises pausing a live video stream.

17. The method as recited in claim 1, wherein time-shifting the second instance of the non-time-shifted video stream comprises rewinding from one point in the stored portion of the second instance of the non-time-shifted video stream to a previous point in the stored non-time-shifted video stream.

18. The method of claim 1, further comprising receiving and duplicating an entire non-time-shifted video stream.

19. A method comprising:

streaming, by a duplicating switch, a live video stream to a first terminal;

receiving, by the duplicating switch, a request from the first terminal to time-shift the live video stream at an intermediate point in the live video stream;

storing one or more portion of the live video stream in a non-transitory storage medium of the duplicating switch, the stored one or more portions of the live video stream including a first instance and a second instance of the live video stream being less than the entire live video stream;

allowing for time-shifting of the live video stream at a first terminal and a second terminal;

duplicating and preparing, using at least one processor of the duplicating switch, a first time-shifted version of the second instance of the live video stream by time-shifting the second instance of the live video stream;

sending the first time-shifted version of the live video stream to the first terminal; and simultaneously streaming the first instance of the live video stream to the second terminal. receiving a request from the terminal to time shift the live video stream.

20. The method as recited in claim 19, further comprising receiving a request from the second terminal to time shift the live video stream.

21. The method as recited in claim 19, further comprising:

time-shifting, using at least one processor, the first instance of the live video stream being sent to the second terminal, wherein the video stream simultaneously streaming to the second terminal comprises a second time-shifted version of the live video stream, the second time-shifted version of the live video stream being time-shifted differently from the first time-shifted version of the live video stream.

22. The method as recited in claim 19, wherein sending the first time-shifted version of the live video stream to the first terminal comprises streaming the first time-shifted version of the live video stream to a mobile device.

23. The method as recited in claim 19, wherein the live video stream is a live stream broadcast.

24. A system comprising:

a first communications interface configured to receive a live video stream;

a second communications interface;

a duplicating switch having at least one processor and one or more non-transitory storage media storing;

a first instance of the live video stream;

a second instance of the live video stream that is less than the entire video stream, the first and second instances of the live video stream allowing for time-shifting of the live video stream for a first terminal and a second terminal;

instructions thereon that, when executed by the at least one processor, cause the duplicating switch to:

send the first instance of the live video stream to the second terminal;

send the second instance of the live video stream to the first terminal;

time-shift the second instance of the live video stream in response to a request from the first terminal to time-shift the live video stream; and cause the second communications interface to send the time-shifted second instance of the live video stream to the first terminal.

25. The system as recited in claim 24, wherein the second instance of the video stream comprises a version of the live video stream.

26. The system as recited in claim 25, wherein the first instance of the live video stream is a non-time-shifted duplication of the live video stream.

27. The system as recited in claim 26, wherein the instructions, when executed by the at least one processor, further cause the system to use one or more location identifiers to mark a point in the second instance of the live video stream when the request from the first terminal to time-shift the live video stream is received.

28. The system as recited in claim 27, wherein the request from the first terminal to time-shift the live video stream comprises a request to pause the live video stream.

* * * * *